(12) United States Patent
Walters

(10) Patent No.: US 7,436,162 B2
(45) Date of Patent: Oct. 14, 2008

(54) BUCK CONVERTER HAVING IMPROVED TRANSIENT RESPONSE TO LOAD STEP DOWN

(75) Inventor: Mike Walters, Apex, NC (US)

(73) Assignee: International Rectifier Corporation, El Segundo, CA (US)

( * ) Notice: Subject to any disclaimer, the term of this patent is extended or adjusted under 35 U.S.C. 154(b) by 33 days.

(21) Appl. No.: 11/403,057

(22) Filed: Apr. 12, 2006

(65) Prior Publication Data

US 2006/0232252 A1 Oct. 19, 2006

Related U.S. Application Data

(60) Provisional application No. 60/671,561, filed on Apr. 15, 2005.

(51) Int. Cl.
*G05F 1/00* (2006.01)
(52) U.S. Cl. ...................................................... 323/285
(58) Field of Classification Search ................. 323/282, 323/284, 285
See application file for complete search history.

(56) References Cited

U.S. PATENT DOCUMENTS 6,753,723 B2 * 6/2004 Zhang ......................... 327/540

2004/0085048 A1 * 5/2004 Tateishi ....................... 323/224

\* cited by examiner

*Primary Examiner*—Gary L Laxton
*Assistant Examiner*—Ramy Ramadan
(74) *Attorney, Agent, or Firm*—Ostrolenk, Faber, Gerb & Soffen, LLP

(57) ABSTRACT

A synchronous buck converter having an improved transient response during output current includes a first switching transistor connected between an input node and a first node, a second switching transistor connected between the first node and a second node, a series inductor connected between the first node and an output node, an output capacitor connected between the output node and the second node, a first driver circuit operative to turn the first switching transistor one and off according to a variable duty cycle determined by an error signal representing the difference between the voltage output of the converter and a reference voltage, a sensing circuit operative to provide a control signal output when the duty cycle for the first switching transistor is zero, a second drive circuit responsive to the control signal output of the sensing circuit to turn off the second switching transistor and a second sensing circuit operative to provide a second control signal when a dissipating current of the inductor is zero, wherein the second drive circuit is responsive to the second control signal to turn the second switching transistor on when the dissipating current of the inductor is zero.

4 Claims, 5 Drawing Sheets

BUCK CONVERTER HAVING IMPROVED TRANSIENT RESPONSE TO LOAD STEP DOWN

REFERENCE TO RELATED APPLICATIONS

The present application claims benefit to and priority from U.S. Provisional Patent Application No. 60/671,561 entitled BUCK CONVERTER HAVING INPROVED TRANSIENT RESPONSE TO LOAD STEP DOWN filed Apr. 15, 2005, the entire contents of which are hereby incorporated by reference herein.

BACKGROUND

Related Art

FIG. 1 illustrates a basic configuration of a synchronous buck converter. The circuit 100 includes a series switch 102 which is typically a power MOSFET or the like, with its source-drain path connected between an input terminal 104 and a first signal node 106, a shunt switch 108, also typically a power MOSFET or the like, and an output circuit comprised of a series inductor 112 and a shunt capacitor 114 connected to inductor 112 at a signal output node 116 and to ground 110. A shunt diode such a Shottky diode 118 may also be provided in parallel with MOSFET 108 if desired to provide conduction during the deadtimes of the switch 108 to reduce the diode reverse recovery loss associated with the internal body diode of MOSFET 108. A separate diode 118 is not required if the higher switching loss is deemed preferable to the added cost of the external Shottky.

A D.C. input voltage $V_{IN}$ is provided between input terminal 104 and ground 110 across an input capacitor 111, and an output voltage $V_{OUT}$ which is less than $V_{IN}$ is provided to a load 124 connected between signal output node 116 and ground 110.

Control of the output voltage is provided by selectively varying the on-off duty cycles of MOSFETS 102 and 108. This is done by a gate control logic or driver circuit 120 connected to the gate terminals of the MOSFETS, and driven by a pulse width modulation circuit 124 which includes a PWM generator 124 which compares a ramp signal of the required switching frequency, with fixed maximum (peak) and minimum (valley) values, with a signal provided by an error amplifier 126. The latter provides an output signal $V_E$ based on the difference between the actual output voltage represented by a feedback signal $V_{FB}$ on signal line 128 and a desired output voltage signal $V_{REF}$ provided at a second input terminal 130.

In operation, with MOSFET 102 ON and MOSFET 108 OFF, the voltage across inductor 112 is equal to $V_{IN}-V_{OUT}$, and the resulting current charges capacitor 114. To maintain substantially constant voltage across capacitor 114, a predetermined value of $V_E$ operates PWM circuit 124 and gate driver 120 to switch MOSFET 102 OFF, and MOSFET 108 ON when appropriate. The very low source-drain resistance of MOSFET 108 when it is conducting maintains a circuit to sustain the current flow through inductor 112. This, in turn, allows capacitor 114 to charge, and after several on-off cycles for the MOSFETS, a steady-state output voltage is achieved. The operation of the circuit shown in FIG. 1 is well known to persons skilled in the art, and a further description will be omitted in the interest of brevity.

Where output currents exceeding the capacity of MOSFETS 102 and 108 are required, a multi-phase buck converter can be employed as is well known in the art. In this case, N synchronous buck converter stages are connected between an input node and a common ground and with their outputs feeding an output node. Thus, each stage contributes a portion of the required current demand. This configuration is also well known to those skilled in the art and thus further description is omitted.

Generally speaking, a load step-up, i.e., an increase in the current demand tends to drive the output voltage $V_O$ down which is typically compensated for by an increase in on-time for series MOSFET 102. On the other hand, a load step-down, i.e. a decrease in current demand tends to drive the output voltage up and is compensated for by decreasing the on-time of the series MOSFET 102.

Looking at FIG. 1, it is clear that if $V_{IN}$ is 12 volts, and $V_{OUT}$ is 1.0 volt, when series MOSFET 102 is turned on and shunt MOSFET 108 is turned off to increase the current through inductor 112, the voltage across inductor 112 will be $V_{IN}-V_{OUT}=11$ V, which will drive the inductor current $I_L$ up. When series MOSFET 102 is turned off and shunt MOSFET 108 is turned on, the voltage across inductor 112 will be applied be $-V_{OUT}=-1$V, which will drive the inductor current $I_L$ down. During steady-state operation, the current rising portion is the same as the current falling portion inside inductor 112, while the D.C. content of the current is the same as the output current.

However, at the moment of load step down, the inductor current $I_L$ will be higher than the output load current $I_{LOAD}$ so that the current difference will flow into the output capacitor 114 to create an output voltage overshoot. This overshoot will not stop until the inductor current $I_L$ drops to the reduced output load current level. The rate of current dissipation will affect how big the overshoot is, but it is determined by the negative voltage across the inductor.

In U.S. Pat. No. 6,753,723, the disclosure and drawings of which are incorporated herein by reference in its entirety as if fully set forth, there is disclosed a technique for improving the transient response of a synchronous buck converter during current stepdown by taking advantage of the so-called body braking effect. In this patent, a sensing circuit provides a control signal output when the duty cycle for the series (high side) MOSFET 102 is zero, indicating a step decrease in load current. A drive circuit responds to the control signal output of the sensing circuit to turn off the shunt or low side MOSFET 108.

FIG. 2 illustrates an exemplary embodiment of a buck converter circuit that includes this feature of the '723 patent. Elements of FIG. 2 that correspond to elements of FIG. 1 are referenced using common reference numerals. The circuit 200 illustrated in FIG. 2 is similar to that illustrated in FIG. 1 except that it includes a zero percent duty cycle detector 202 to generate an output signal indicating that series MOSFET 102 will be required to remain off throughout the entire switching cycle. This signal is generated when the voltage output is higher than the regulation point, for example, due to an overshoot resulting from load step down.

Since the output of the PWM 124 is generated by comparing the error voltage $V_E$ with a triangular ramp having fixed peak and valley values, a $V_E$ value higher than the peak of the ramp will require a 100% duty cycle, and a $V_E$ value lower than the valley of the ramp, will require a 0% duty cycle. The zero duty cycle detection circuit 202 can therefore be a circuit which is connected to the output of error amplifier 206 to detect if $V_E$ goes lower than the fixed ramp valley voltage.

The output signal from zero duty cycle detector 202 is preferably connected to one input of an AND gate 208. A second input is provided through an inverter 210 by the gating signal for series MOSFET 102. The output of AND circuit 209 drives the gate of shunt MOSFET 108, whereby both MOSFETS are held off and the inductor current $I_L$ can dissipate through the body diode of shunt MOSFET 102 when the duty cycle for series MOSFET 102 is zero.

The advantage of this configuration is that the voltage drop across the body diode of the shunt MOSFET and/or that across the Shottky diode 118, for example, is larger than it would be across the conducting channel of the MOSFET 108 and thus the transient current dissipates faster.

While the circuit of FIG. 2 provides for a faster decline in the output voltage, however, the performance of this circuit could be improved, particularly in the situation in where the inductor dissipating current reaches 0.

SUMMARY

The present invention is a further improvement on the technique disclosed in the '723 patent as discussed above. According to the present invention, instead of allowing the inductor current $I_L$ to complete its dissipation by the body braking effect as is provided in the '723 patent, a second sensing circuit, an inductor current sensing device, is provided to detect when the inductor dissipation current reaches zero. At that time, the low side MOSFET 108 is turned on and kept on until the output voltage reaches the regulated value.

Since the overshoot is inversely proportional to the output capacitance, traditionally large and costly output capacitors are used to reduce the overshoot. To avoid this, it has been found that it is possible to discharge the energy in the inductor 112 more quickly by disabling shunt MOSFET 108 entirely during step-down thus allowing the dissipating current to flow through the body diode of MOSFET 108, and the parallel Shottky diode 118 which will have a larger voltage drop across them than there would be across the channel of the MOSFET as discussed above with regard to the '723 patent.

By turning the low side MOSFET 108 ON when the inductor current $I_L$ reaches zero, a reverse current is enabled to flow from the inductor 112 through the channel of the low side MOSFET 108. As a result, the output voltage $V_O$ drops quickly to correct the overshoot.

A synchronous buck converter having an improved transient response during output current step down in accordance with the present invention includes a first switching transistor connected between an input node and a first node, a second switching transistor connected between the first node and a second node, a series inductor connected between the first node and an output node, an output capacitor connected between the output node and the second node, a first driver circuit operative to turn the first switching transistor on and off according to a variable duty cycle determined by an error signal representing the difference between the voltage output of the converter and a reference voltage, a sensing circuit operative to provide a control signal output when the duty cycle for the first switching transistor is zero; a second drive circuit responsive to the control signal output of the sensing circuit to turn off the second switching transistor, and a second sensing circuit operative to provide a second control signal when a dissipating current of the inductor is zero, wherein the second drive circuit is responsive to the second control signal to turn the second switching transistor on.

A synchronous buck converter having an improved transient response during output current step down in accordance with an embodiment of the present application includes series MOSFET connected between an input node and a first node, a shunt MOSFET connected between the first node and a second node, a series inductor connected between the first node and an output node, an output capacitor connected between the output node and the second node, a first driver circuit operative to turn the first switching transistor on and off according to a variable duty cycle determined by an error signal representing the difference between the voltage output of the converter and a reference voltage, a sensing circuit operative to provide a control signal output when the duty cycle for the series MOSFET is zero, a second drive circuit responsive to the control signal output of the sensing circuit to turn off the shunt MOSFET and a second sensing circuit operative to provide a second control signal when a dissipating current of the inductor is zero, wherein the shunt MOSFET is responsive to the second control signal to turn the shunt MOSFET on when the dissipating current of the inductor is zero.

DETAILED DESCRIPTION

Figure 1:
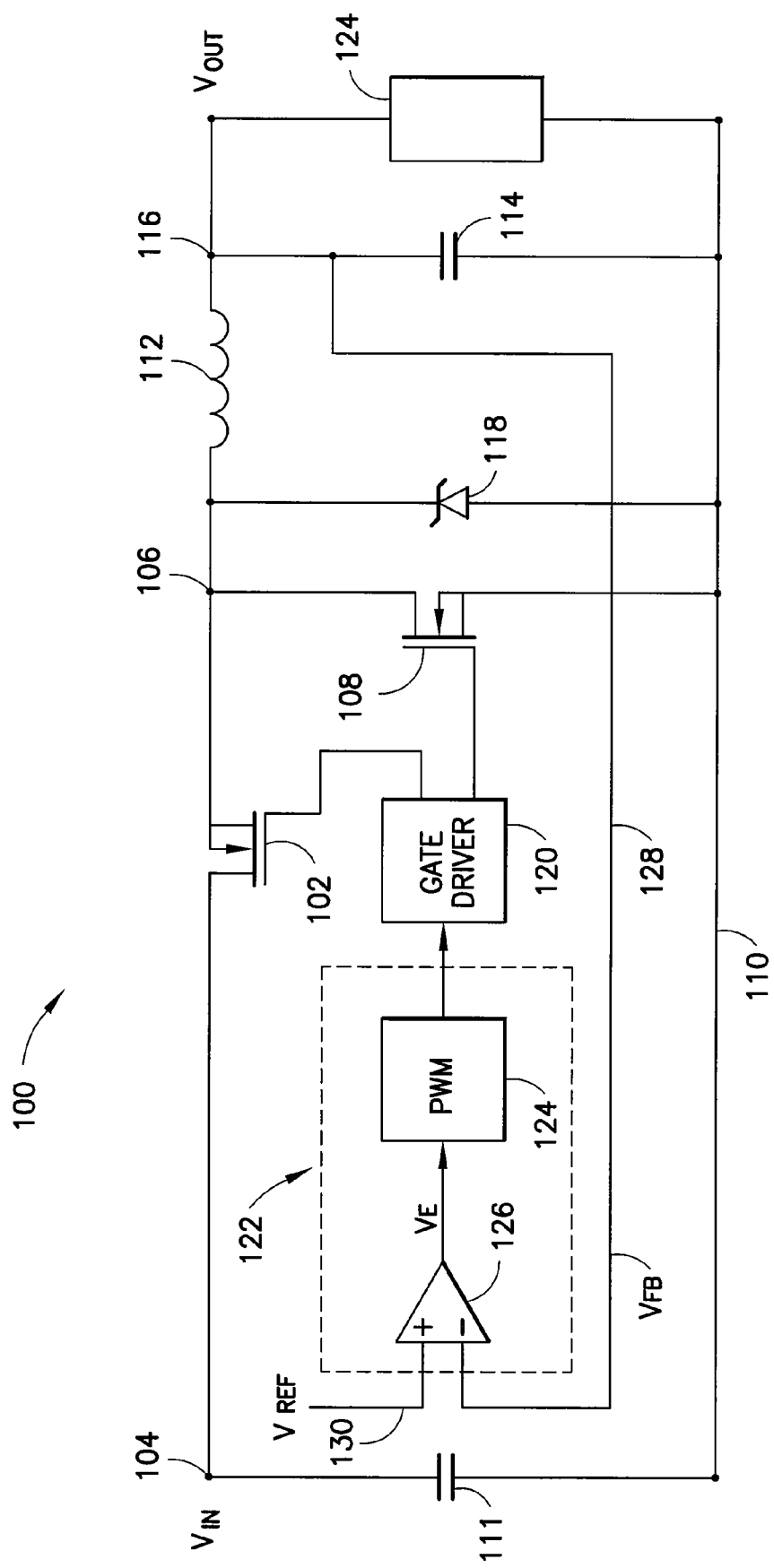
FIG. 1 is a schematic diagram of a synchronous buck converter useful in explanation of the operation of such devices in general.
Figure 2:
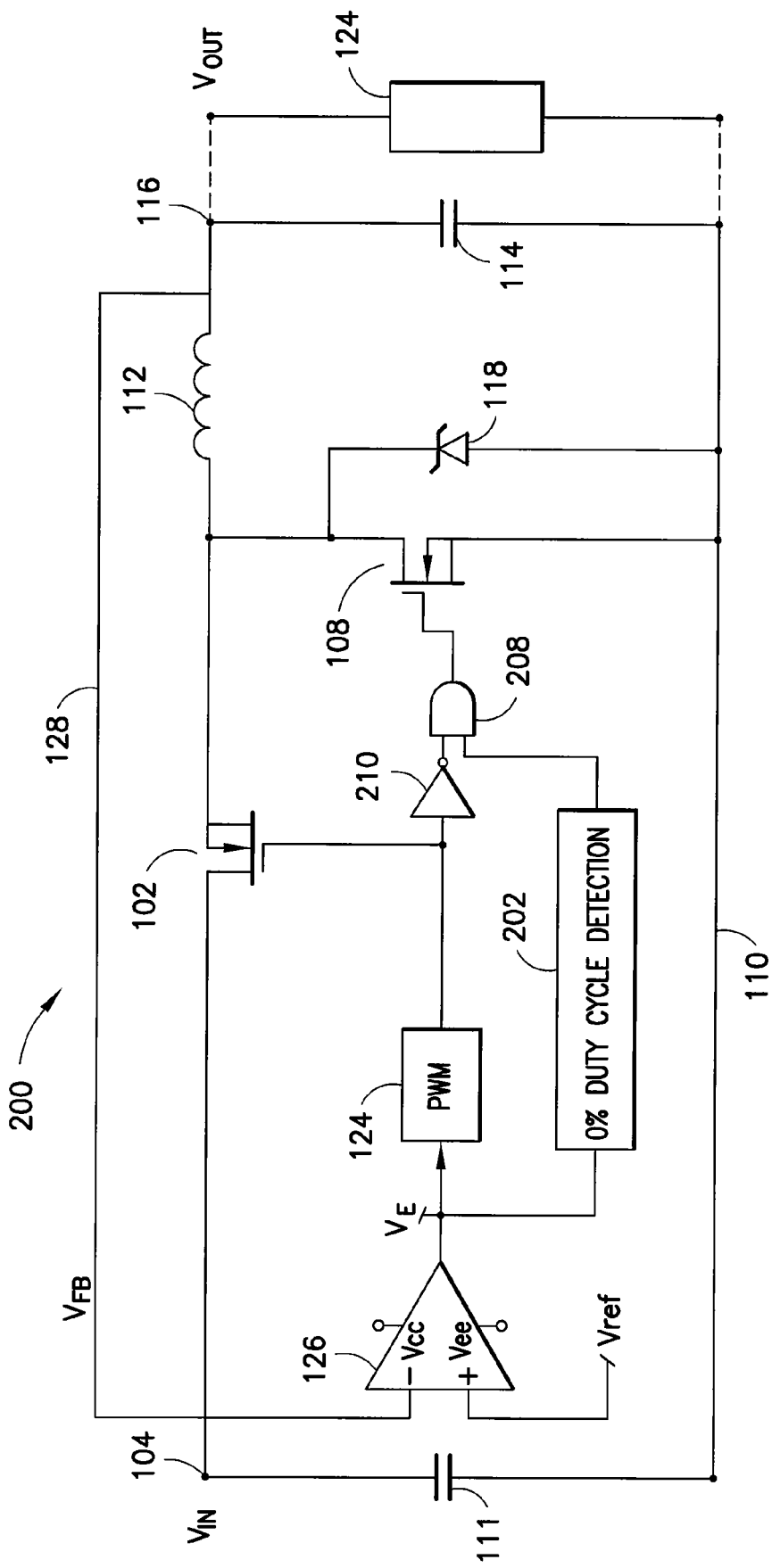
FIG. 2 illustrates a technique for improving transient performance during load step down in accordance with an embodiment of U.S. Pat. No. 6,753,723.
Figure 3:
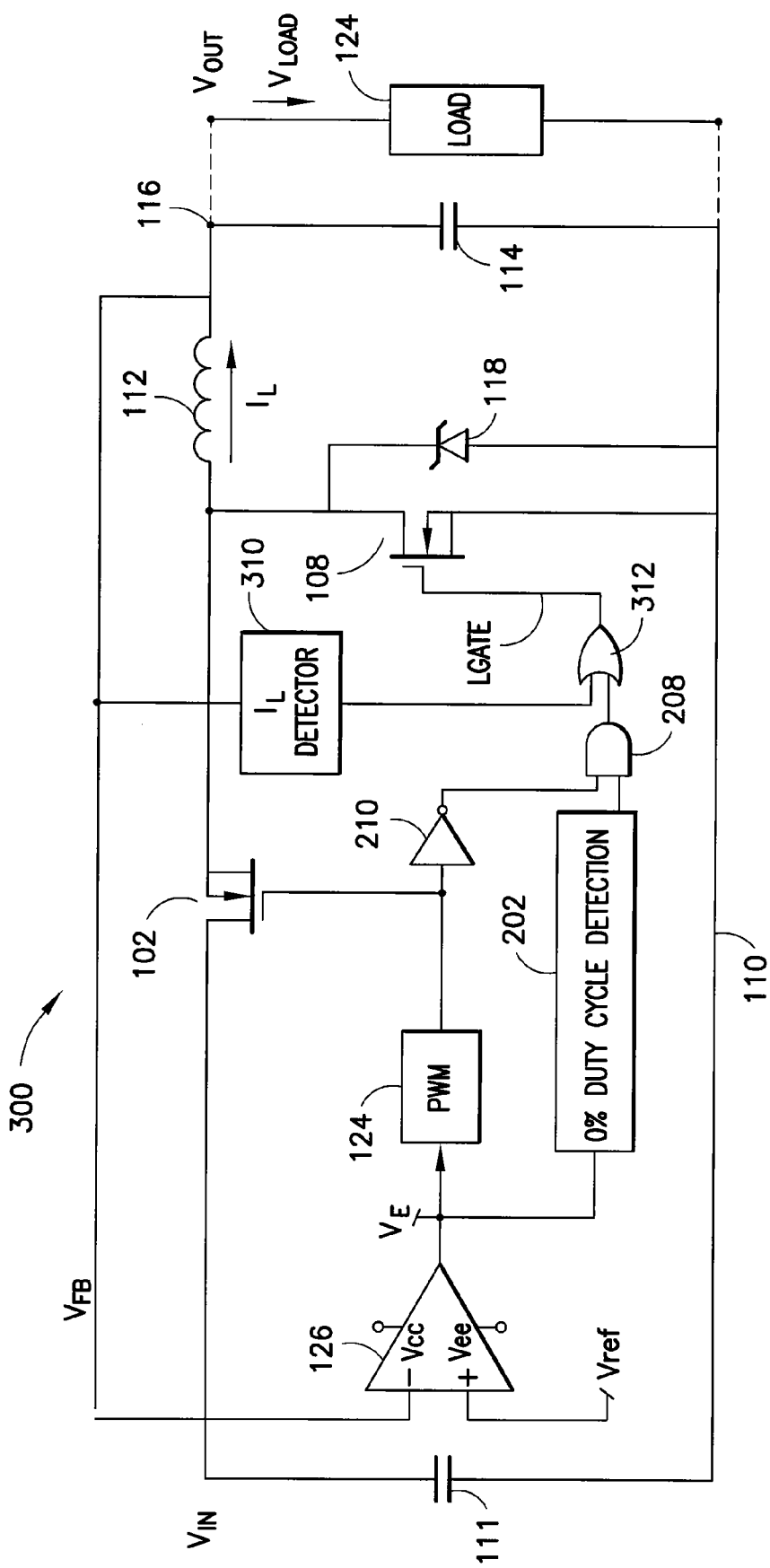
FIG. 3 illustrates a technique for further improving transient performance during load step down according to an embodiment of the present application.

FIG. 3 illustrates a buck converter circuit 300 in accordance with an embodiment of the present application. The circuit of FIG. 3 is similar to that of FIG. 2 and common elements are referred to by the same reference numerals. The circuit of FIG. 3 differs from that of FIG. 2 in that an inductor current sensing device 310 is provided to sense when the inductor dissipating current $I_L$ reaches zero. An output of the inductor current sensing device is then used to turn the lower MOSFET 108 ON when the inductor current is zero.

In operation, in the converter circuit 300 of FIG. 3, in the event of a step down in load current $I_{LOAD}$, the zero duty cycle sensor 202 detects whether the duty cycle of the series transistor 102 is 0%. If so, a control signal from the zero duty cycle sensor is provided to shut off the lower MOSFET 108 in order to gain the benefits of body breaking as described above with reference to the '723 patent. The inductor current sensing device 310, meanwhile monitors the inductor current $I_L$, and provides a second control signal to indicate when the inductor current is zero. This second control signal is used to turn the lower MOSFET 108 back ON.

In a preferred embodiment, an OR gate 312 is provided with the output of AND gate 208 provided to one input thereof and the output of the inductor current sensing device 310 connected to another input thereof. The output of the OR gate 312 (LGATE) is provided to the gate of the lower or shunt MOSFET 108. As a result, when the duty cycle of the series MOSFET 102 is 0%, a control signal is provided through AND gate 208 and OR gate 312 to the shunt MOSFET 108 to turn the MOSFET OFF as is described in the '723 patent. As a result the inductor dissipation current flows through the body diode of the MOSFET 104 and/or the Shottky diode 118, if provided, which provides for a larger voltage drop and thus speeds the rate at which the inductor dissipating current drops. When the inductor current reaches zero, however, the inductor current sensing device 310 provides a signal to the gate of the MOSFET 108, preferably via the OR gate 312, to turn the MOSFET 108 back ON. As a result, a negative current can flow from the inductor 112 through the lower MOSFET 108 to rapidly lower the output voltage $V_O$. The inductor current sensing device 310 may be implemented in any appropriate manner to monitor the inductor current. Similarly any appropriate logic may be used to provide the first and second control signals to the MOSFET 108.

Figure 4:
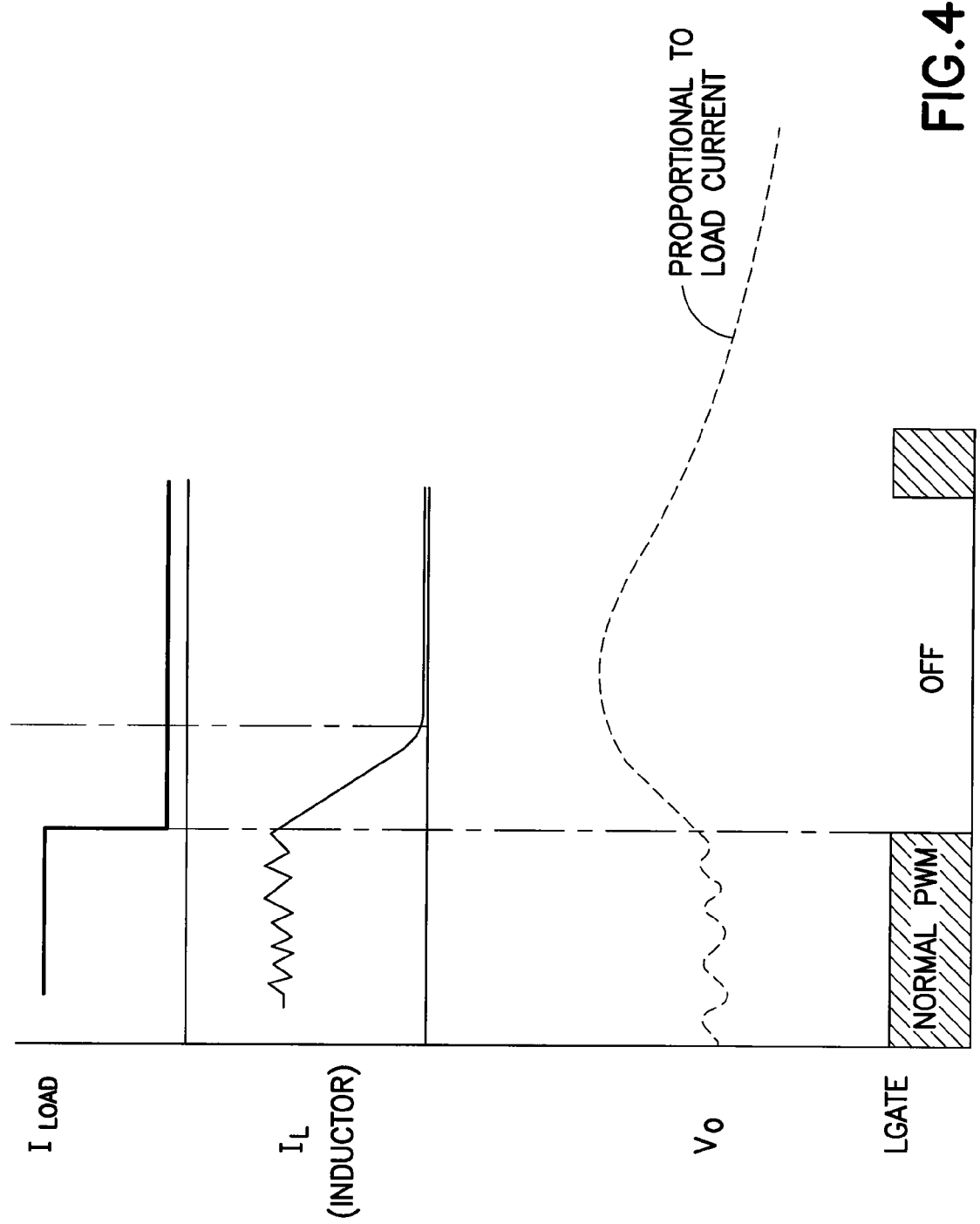
FIG. 4 is a waveform diagram related to the circuit illustrated in FIG. 2.

FIG. 4 is a waveform illustrating the load current, $I_{LOAD}$, the inductor current, $I_L$ and the output voltage, $V_O$, of the converter circuit 200 of FIG. 2. As can be seen, while the inductor current $I_L$ dissipates rapidly by virtue of benefits provided by the body breaking method of the '723 patent, the output voltage $V_O$ does not dissipate quickly. That is, because the output voltage $V_O$ is proportional to the load current $I_{LOAD}$ which is relatively small, the output voltage does not drop quickly. As illustrated, the signal LGATE indicates when to turn the MOSFET 108 ON or OFF.

Figure 5:
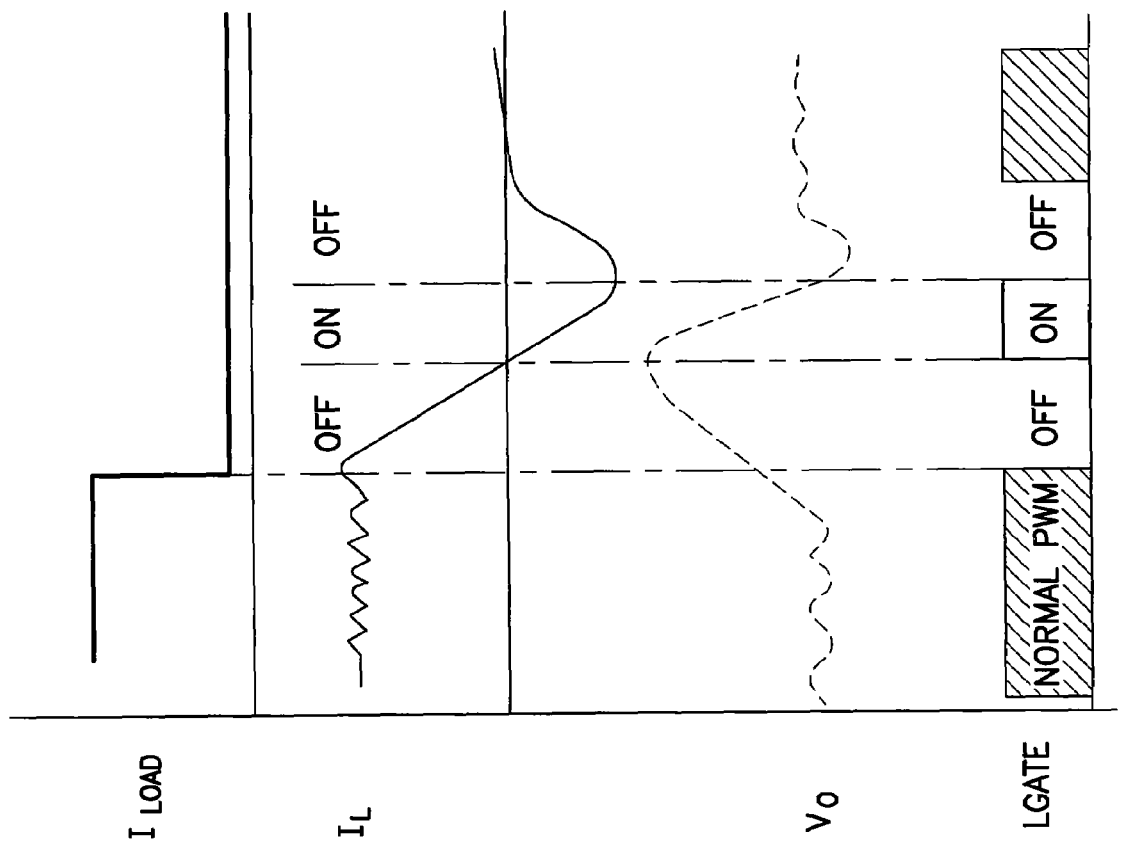
FIG. 5 is a waveform diagram related to the circuit illustrated in FIG. 3 in accordance with an embodiment of the present application.

FIG. 5, on the other hand, shows the load current, $I_{LOAD}$, the inductor current, $I_L$, and the output voltage, $V_O$, of the converter circuit 300 of FIG. 3, in accordance with an embodiment of the present application. As seen in the waveform of FIG. 5, the reverse current that flows from the inductor 112 through the MOSFET 108 after the MOSFET 108 is turned back on, serves to rapidly reduce the output voltage $V_O$. As a result, the output voltage will rapidly be reduced to the desire level. After the output voltage approaches the desired level, the MOSFET 108 may be turned back OFF. As illustrated, the signal LGATE indicates when to turn the MOSFET 108 ON or OFF.

As the output voltage $V_O$ approaches the desired value the signal $V_E$ will move within the range between the peak and valley of the ramp signal of the PWM device 124. As a result, the duty cycle of the series MOSFET 102 will no longer be 0% and therefore the body breaking technique is no longer necessary. Further, the inductor current sensing device 310 may also be operative to change the control signal that it provides to the MOSFET 108 when the output voltage $V_O$ reaches the desired level. Thus, the ON/OFF state of the MOSFET 108 will be based purely on the PWM signal provided by the PWM device 124 for example.

Although the present invention has been described in relation to particular embodiments thereof, many other variations and modifications and other uses will become apparent to those skilled in the art. It is intended, therefore, that the present invention be limited not by the specific disclosure herein, but only by the appended claims.

What is claimed is:

1. A synchronous buck converter having an improved transient response during the output current step down comprising:
   a first switching transistor connected between an input node and a first node;
   a second switching transistor connected between the first node and a second node;
   a series inductor connected between the first node and an output node;
   an output capacitor connected between the output node and the second node;
   a first driver circuit operative to turn the first switching transistor on and off according to a variable duty cycle determined by an error signal representing the difference between the voltage output of the converter and a reference voltage;
   a sensing circuit operative to provide a control signal output when the duty cycle for the first switching transistor is zero;
   a second drive circuit responsive to the control signal output of the sensing circuit to turn off the second switching transistor; and
   a second sensing circuit operative to provide a second control signal when a dissipating current of the inductor is zero, wherein the second drive circuit is responsive to the second control signal to turn the second switching transistor on when the dissipating current of the inductor is zero with said inductor connected to said output node, thereby enabling a reverse current to flow from the inductor through the second switching transistor and providing enhanced reduction of said voltage output at said output node.

2. The synchronous buck convener of claim 1, wherein the second sensing circuit is operative to change the second control signal to turn the second switching circuit off when the output voltage reaches a desired value.

3. The synchronous buck converter of claim 1, wherein:
   said first switching transistor is a series MOSFET connected between the input node and the first node; and
   said second switching transistor is a shunt MOSFET connected between the first node and the a second node.

4. The synchronous buck converter of claim 3, wherein the second sensing circuit is operative to change the second control signal to turn the shunt MOSFET off when the output voltage reaches a desired value.

* * * * *